Dec. 22, 1925.
C. B. CARTER
PROCESS OF PRODUCING METHYLALS
Filed July 26, 1924
1,566,819
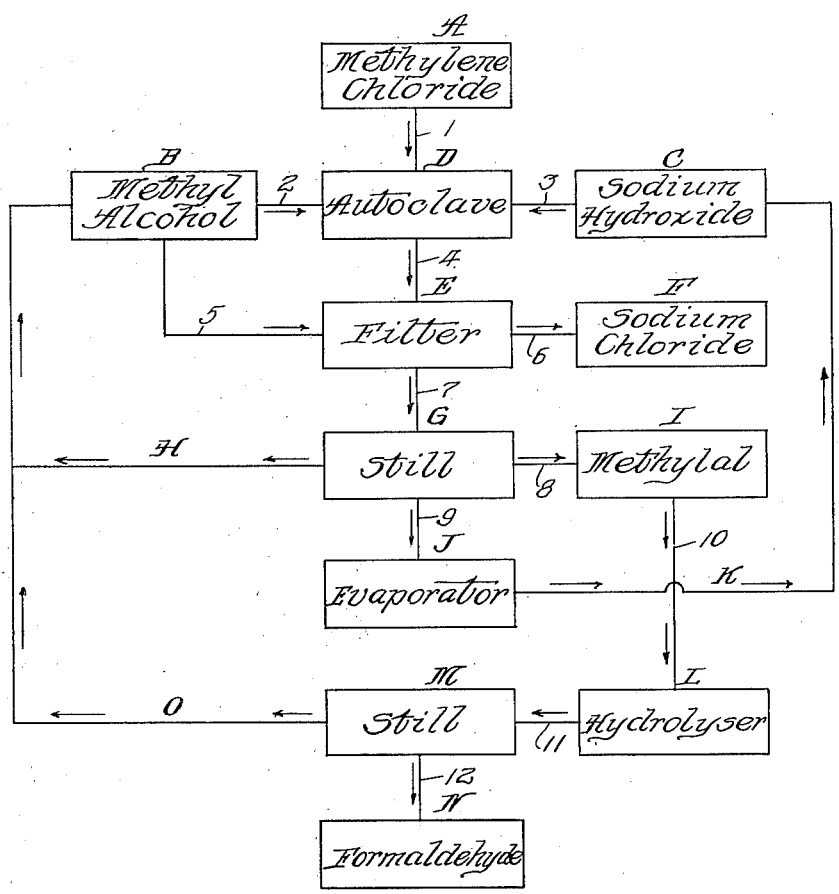
Inventor:
Carrie B. Carter, Patented Dec. 22, 1925.

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PROCESS OF PRODUCING METHYLALS.

Application filed July 26, 1924. Serial No. 728,461.

To all whom it may concern:

Be it known that I, CARNIE B. CARTER, a citizen of the United States, residing at Pittsburgh, in the county of Allegheny and State of Pennsylvania, have invented a new and useful Improvement in Processes of Producing Methylals, of which the following is a specification.

The present invention pertains to a process for producing methylals in an economical manner.

The methylals are double ethers derived, ordinarily, by the condensation of formaldehyde with alcohols, water being eliminated. Various methylals can be prepared in this way by using various members of the alcohol series.

According to the present invention, the methylals can be produced from methylene chloride, which is a by-product obtained from the chlorination of natural gas, for example. The present invention enables methylene chloride, for which there is little or no commercial demand, to be utilized in producing methylals; and methylals may, in turn, be used in the production of various materials, such as formaldehyde and hexamethylenetetramine, which are widely used in the arts.

Methylals are very stable substances in neutral or alkaline solutions but are very unstable in the presence of acids. In the presence of aqueous acids they hydrolyze readily to formaldehyde and the corresponding alcohol in accordance with the following equation, for example:

$$CH_3OCH_2OCH_3 + H_2O = 2CH_3OH + CH_2O.$$

Dimethyl methylal may thus be hydrolyzed in about one hour by heating with acidulated water at a temperature of 100° C. Very pure formaldehyde may be prepared in this way, since it is possible to prepare methylals of high purity.

In accordance with the present invention, methylene chloride is caused to react with a suitable alkali metal hydroxide in alcoholic solution. Under proper conditions, this gives rise to a large yield of methylal, the kind of methylal obtained being dependent upon the kind of alcohol used as a solvent. The yields are determined in large measure by the concentration of alcohol used. Yields approximating 90% or more of the theoretical value can be obtained in solutions of very high alcoholic concentrations.

In a mixture, or solution, of methylene chloride, alcohol, and an alkali, reactions occur which probably may be represented as follows:

(a) $CH_3OH + NaOH = NaOCH_3 + H_2O.$
(b) $CH_2Cl_2 + 2NaOCH_3 =$
$$CH_3OCH_2OCH_3 + 2NaCl.$$
(c) $CH_2Cl_2 + 2NaOH =$
$$CH_2O + H_2O + 2NaCl.$$

Thus, it seems that the alkali in solution acts both as such and as an alcoholate, only the portion acting as an alcoholate being of value in the production of methylal, the remainder giving rise to free formaldehyde. The free formaldehyde subsequently is acted upon by the alkali and consumed in accordance with one or both of the two reactions which follow:

(d) $2CH_2O + NaOH = NaCOOH + CH_3OH.$
(e) $xCH_2O + NaOH = \text{sugars} + \text{water}.$ Reaction (d) results in the production of formate and methyl alcohol; whereas reaction (e) is very complex, $x$ parts of the formaldehyde condensing under the influence of the alkali to form very complex sugar-like bodies and liberating water. There are various reasons for assuming that the equations given above portray the mechanism of the action taking place when methylene chloride and alcoholic solutions are caused to react upon each other.

Methylene chloride reacts with an alcoholic solution of sodium hydroxide at ordinary temperatures, but the reaction is too slow to be of practical importance. At such temperature, the reaction is only 4% to 5% complete after 150 hours. The reaction velocity increases rapidly with rising temperature and becomes of practical importance in the neighborhood of 50° C. to 60° C., at which temperature reaction is complete in about 75 to 100 hours. At a temperature of 100° C., reaction is complete in about 3 hours; and at 125° C., in about 40 to 50 minutes.

A temperature of 100° to 125° C. is a satisfactory working temperature for practice of the process, the corresponding pressure being in the neighborhood of 100 pounds per square inch. At a lower temperature, the pressure is lower. For example, at about 60° C., the pressure does not rise much above atmospheric pressure. While a temperature as low as 60° C. may be employed, the time for completing the reaction is unduly prolonged; and it is preferred, therefore, to practice the process at a temperature materially above 60° C.

The reactions take place in solutions of high alcoholic content; they also take place in solutions of lower alcoholic content, but it is undesirable to carry out the reaction in dilute alcoholic solutions since such procedure leads to poor yields of the methylal. It has been found, for illustration, that from a solution containing 67% alcohol, the yield of methylal was 60%; from a solution containing 86% alcohol, the yield of methylal was 80%; and from a solution containing 96% alcohol, the yield was 85%.

The alcohol used in the foregoing tests was commercial 96% methyl alcohol.

As the water content of the liquor increases, the yield of methylal decreases. It is important, therefore, in carrying out the process if a large yield of methylal is to be secured, that the reaction be performed in relatively dilute alkali solution, it being noted that water is produced in the reaction, as indicated in equation (a) above.

Thus, two mols of water are produced for each mol of methylal formed, inasmuch as two mols of the alcoholate are required for each mol of methylal produced. To keep the water content low, the reaction should take place in a solution of high alcoholic content and low sodium hydroxide concentration.

While the equations given above, in view of the foregoing explanation, will suffice to indicate proportions to be used, the following may be given as an example of suitable proportions and a suitable mode of procedure:

Charge into an autoclave 100 gallons of alcohol; 10 gallons of methylene chloride; and about 110 pounds of caustic, such as sodium hydroxide. Heat the autoclave at a temperature of 100 to 125° C. for the requisite period, usually about forty minutes; and, finally, separate the methylal by a suitable procedure, such as that hereinafter described. From the batch given above, there should be produced about 10 to 11 gallons of methylal, which is a yield of about 85%.

The process may be practiced conveniently by apparatus such as that shown diagrammatically in the accompanying drawing; and the process may be described conveniently with reference to the drawing.

A represents a supply tank containing methylene chloride; B, a supply tank containing methyl alcohol; C, a supply tank containing sodium hydroxide; D, an autoclave, which may be provided with suitable means for heating, and which preferably also is equipped with a suitable stirring device; E, a filter, which is employed for separating the salt formed (sodium chloride in the example given) from the filtrate; F, a storage chamber for the sodium chloride; G, a still, where the alcohol and methylal may be fractionally distilled, the alcohol passing through the line H to the storage-tank B, and the methylal passing to the storage-tank I; J, an evaporator from which the sodium hydroxide may be returned through the line K to the storage-tank C; L, a hydrolyzer, where the methylal may be treated for the production of formaldehyde; M, a still receiving the mixture from the hydrolyzer and from which the alcohol formed may pass through the line O to the storage-tank B; and N, a storage-tank for the formaldehyde.

In the diagram, numerals 1 to 12 inclusive, represent lines, and the accompanying arrows indicate the courses followed by the materials. The line 5 conveys alcohol to the filter for washing purposes. It will be understood that the filtering device E may comprise an ordinary filter or a suitable centrifuging machine. The sodium hydroxide may be introduced into the supply tank C in solid form, in the first instance; or, it may be dissolved in methyl alcohol, or a dilute solution of water, and fed into the system.

Methylene chloride from storage A, methyl alcohol from storage B, and sodium hydroxide from storage C are drawn into autoclave D where the alkali if used in solid form is dissolved. The mixture then is heated at 100° to 125° C., for from one to three hours in order to effect complete reaction. The reaction product passes thence through a filter E where sodium chloride is removed, the filtrate going into the still G. Here methylal and alcohol are fractionated off, the former going into storage I and the latter into storage B to be used again. The still residue contains the water resulting in the reaction and any excess of sodium hydroxide as well as a small amount of sodium chloride. This residual liquor goes into evaporator J where the water is removed, the final residue then being returned to the system through alkali storage C as indicated by pipe K. It is to be noted that instead of introducing solid alkali into autoclave D it may be dissolved in the alcohol from C and introduced in solution. In practice the alkali probably would be added to the reaction mixture in this way.

It will be observed that methyl alcohol, methylene chloride and sodium hydroxide are consumed in the reaction and that methylal, sodium chloride and water are formed. If the methylal is to be used for the production of formaldehyde, it is passed into the hydrolyzer L, where it is heated, under pressure, with acidulated water to form formaldehyde and methyl alcohol. The aqueous alcoholic solution of formaldehyde goes then to still M where the alcohol is removed going back to storage B, the formaldehyde being left behind in the aqueous solution. If sulphuric acid is used in the hydrolyzer all acid can be effectively removed from the aqueous formaldehyde solution by treatment with barium carbonate the carbonate reacting with the acid to form barium sulphate which is insoluble and carbonic acid which breaks down and evolves carbon dioxide. The method leads to the production of formaldehyde of high purity.

Various alkalis of the alkali metals may be used, as, for example, sodium hydroxide, potassium hydroxide, and lithium hydroxide. It may be added, however, that lithium hydroxide is too rare and expensive, at the present time, for commercial use in the process.

The alkali of the alkaline earth metals, for example, calcium hydroxide, will not pass readily into solution, especially with high alcoholic concentration; hence, it is desirable to use an alkali of an alkali metal.

Any methylal can be prepared by the process, by using the appropriate alcohol, as, for example, ethyl, methyl, propyl and butyl alcohols.

Some alcohol is produced by reaction in the autoclave, and also some formate is produced. The alcohol produced is recovered; and, if desired, the formate may be recovered in any suitable manner. If desired, one may use only a slight excess of alkali, in which case the step of recovering and returning the sodium hydroxide to the source of supply may be omitted. At the evaporator J, any excess of water introduced into the system by reaction may be evaporated, or taken out of the system.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. The process of producing methylal which comprises causing a reaction between methylene chloride, alcohol and an alkali.

2. The process of producing methylal which comprises heating methylene chloride, alcohol and an alkali in a closed vessel, or under pressure.

3. The process of producing methylal which comprises subjecting a mixture of methylene chloride, alcohol and an alkali metal compound to a temperature exceeding 60° C., in a closed vessel or under pressure.

4. The process of producing methylal which comprises causing a reaction between methylene chloride, alcohol and a compound of an alkali metal, separating the salt formed in the reaction from the filtrate, and separating methylal from the filtrate by distillation.

5. The process of producing methylal which comprises subjecting a mixture of methylene chloride, alcohol and a caustic alkali to a temperature exceeding 60° C., under pressure, separating the salt formed from the filtrate, and fractionally distilling the filtrate to separate the methylal therefrom.

6. The process of producing methylal which comprises causing a chemical reaction between methylene chloride, methyl alcohol, and a caustic alkali, separating the salt formed from the filtrate, and fractionally distilling the filtrate to separate therefrom the methylal.

7. The process of producing methylal which comprises causing reaction between methylene chloride, methyl alcohol and sodium hydroxide, separating the sodium chloride formed from the filtrate, and recovering the methylal from the filtrate.

8. The process of producing methylal which comprises heating, under pressure, a mixture of methylene chloride, alcohol, and a caustic alkali, separating the salt formed from the filtrate, and fractionally distilling the filtrate to recover the alcohol on one hand and methylal on the other.

9. The process of producing formaldehyde which comprises causing a reaction between methylene chloride, alcohol and a caustic alkali, separating the methylal formed from the resultant mixture, and subjecting the methylal to a hydrolyzing operation and separating the formaldehyde from the resultant products.

10. The process of producing methylal which comprises subjecting a mixture of alcohol, methylene chloride, and caustic alkali, taken in proportions of about one hundred gallons of alcohol, ten gallons of methylene chloride and one hundred ten pounds of caustic alkali to the action of heat at a temperature exceeding 60° C., and separating the methylal formed in the reaction from the other products of the reaction mixture.

CARNIE B. CARTER.